United States Patent
Collet

(10) Patent No.: US 11,436,886 B2
(45) Date of Patent: Sep. 6, 2022

(54) METHOD FOR GENERATING AN ACCESS CODE TO AN EVENT

(71) Applicant: MASTERCARD INTERNATIONAL INCORPORATED, Purchase, NY (US)

(72) Inventor: Eric Collet, Herent (BE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 17/017,847

(22) Filed: Sep. 11, 2020

(65) Prior Publication Data
US 2021/0074104 A1  Mar. 11, 2021

(30) Foreign Application Priority Data
Sep. 11, 2019  (EP) .................................. 19196591

(51) Int. Cl.
*G07C 9/27* (2020.01)
*G06K 19/06* (2006.01)
*G06Q 10/02* (2012.01)
*G06Q 20/04* (2012.01)
*G06Q 20/40* (2012.01)

(52) U.S. Cl.
CPC ......... *G07C 9/27* (2020.01); *G06K 19/06009* (2013.01); *G06Q 10/02* (2013.01); *G06Q 20/045* (2013.01); *G06Q 20/40145* (2013.01)

(58) Field of Classification Search
None
See application file for complete search history.

(56) References Cited

U.S. PATENT DOCUMENTS

| | | | |
|---|---|---|---|
| 7,004,388 B2 | 2/2006 | Kohta | |
| 2004/0133804 A1 | 7/2004 | Smith et al. | |
| 2010/0219234 A1* | 9/2010 | Forbes | G06Q 10/02 235/375 |
| 2012/0221474 A1 | 8/2012 | Eicher et al. | |

(Continued)

FOREIGN PATENT DOCUMENTS

GB    2501362 A    10/2013

OTHER PUBLICATIONS

Extended European Search Report issued in European Application No. 19196591.2, dated Feb. 25, 2020, 8 pages.

(Continued)

*Primary Examiner* — Kristy A Haupt
(74) *Attorney, Agent, or Firm* — Talem IP Law, LLP

(57) ABSTRACT

A computer-implemented method is provided for generating an access code to an event, comprising: a user obtaining an access right to the event from an access provider; the user authenticating themselves to the access provider using a legal form of identification comprising one or more biometric identifiers and the user generating an access code using a mobile device wherein the user provides biometric data and if approved, the access code is generated as a combination of the access right to the event, the user and the mobile device. By using these three data inputs, a substantially unique access code is generated. Complicated authentication, such as facial recognition at an entrance to the event, is no longer required, as it has already been performed before approaching the access code reader.

9 Claims, 1 Drawing Sheet

(56) References Cited

U.S. PATENT DOCUMENTS

| | | |
|---|---|---|
| 2013/0138570 A1 | 5/2013 | Ross |
| 2016/0019539 A1 | 1/2016 | Hoyos et al. |
| 2017/0316626 A1* | 11/2017 | Smith .................... G07C 9/257 |
| 2019/0035042 A1* | 1/2019 | Attar .................. G06K 9/00067 |
| 2019/0089702 A1 | 3/2019 | Bhatt et al. |
| 2019/0228141 A1* | 7/2019 | Shimizu ........... G06Q 20/40145 |

OTHER PUBLICATIONS

'Architektur elektronischer Personalausweis und elektronischer Aufenthaltstitel', May 27, 2011, [retrieved on Apr. 15, 2013], 42 pages, Retrieved from https://www.bsi.bund.de/DE/Publikationen/TechnischeRichtlinien/tr03127/tr-03127.html.

Office Action issued in European Application No. 19196591.2, dated Jun. 8, 2021, 7 pages.

\* cited by examiner

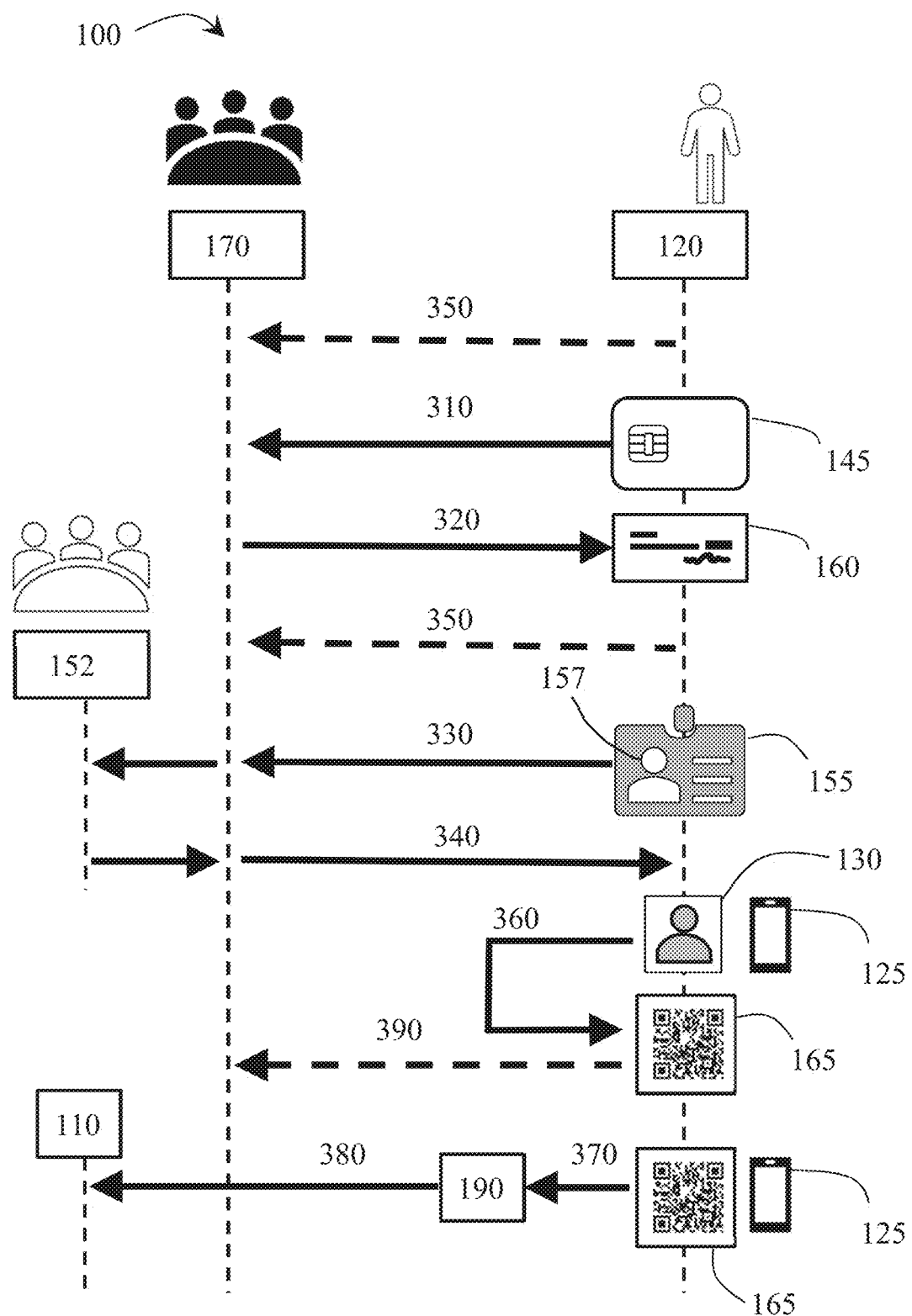

METHOD FOR GENERATING AN ACCESS CODE TO AN EVENT

TECHNICAL FIELD

The present disclosure relates to a computer-implemented method for generating an access code to an event.

BACKGROUND

In the past, tickets to events were often sold at a point of access to the event immediately before consumers entered—the validity of these tickets was seldom a problem. Tickets that may be purchased days or even weeks earlier could be copied and counterfeited—this has been traditionally addressed by incorporating designs that are difficult to copy using everyday scanning and copying equipment. Additionally, tickets may be provided with serial numbers and/or seat numbers to further reduce the risk.

The purchase, handling and management of tickets is now largely online, which has amplified a number of problems.

Ticket touts (scalpers) may buy a number of tickets through legitimate channels, and sell them with a very high markup through other channels ("black" markets). With digital tickets, they may even sell the same ticket more than once, leading to disappointment when a second user tries to gain access using a ticket with the same serial number as an earlier attendee (the second person will be refused access). The prevalence of "bots" on-line which are programmed to buy a large number of tickets as soon as they become available has made this problem even worse.

A ticket may be bought by a user who reveals an identity associated with the payment details. Usually, the ticket includes a name, and the terms and conditions restrict use to the user named—however, at larger events, it is difficult and time-consuming to check identities when an attempt is made to access the venue with what appears to be a valid ticket. So, these checks are usually not performed. However, for some events, the unknown identity of one or more attendee may create a security risk. There are some attempts to use facial recognition, but these may considerably slow down the flow of attendees, they increase the costs and they raise a lot of privacy issues.

Where the access to an event may be gained with duplicate and/or counterfeited tickets, the number of attendees may become unpredictable, complicating crowd control.

Although most of the ticket processes are digital, many events still rely on paper-based tickets, which are relatively easy to duplicate. They may also be transferred to other users.

Measures taken to improve these issues also restrict the ability to provide a system where tickets may be legitimately sold and re-purchased. For example, the original purchaser could still retain a copy of the original ticket.

It is an object of the invention to provide simpler and easier processes for managing the usage and re-usage of tickets, and in particular managing the identities of ticket holders.

BRIEF SUMMARY

According to a first aspect of the present disclosure, there is provided a computer-implemented method for generating an access code to an event, the method comprising: a user obtaining an access right to the event from an access provider; the user authenticating themselves to the access provider using a legal form of identification comprising one or more biometric identifiers; and the user generating an access code using a mobile device wherein: the user provides biometric data to the mobile device; the biometric data is compared to the one or more biometric identifiers; and if the biometric data is approved, the access code is generated as a combination of the access right to the event, the user and the mobile device.

By using these three data inputs, a substantially unique access code is generated. It allows a more complete overview of actual identities and a more accurate overview of the number of attendees. In addition, paper-based tickets are no longer required—all access may be digital.

According to a further aspect of the present disclosure, there is provided a computer-implemented method which comprises: the user providing the access code using the mobile device to an access code reader; the access code reader verifying the validity of the access code; and if the access code is approved, access to the event for the user is granted.

Complicated authentication, such as facial recognition at an entrance to the event, is no longer required, as it has already been performed before approaching the access code reader. Pre-authentication may significantly increase the flow of attendees through the entrance.

According to yet another aspect of the present disclosure, there is provided a computer-implemented method which comprises: the user providing the access code to the access provider; and the access provider storing the access code in an electronic computer database associated with the event.

Optionally, it may be advantageous to provide the access code to the access provider as they typically maintain a database of attendees and their access rights and/or access codes.

According to a still further aspect of the present disclosure, the mobile device further comprises a display, configured and arranged to present a 2-dimensional (2D) coded representation of the access code on the display.

Such a representation provides a user-friendly way to present the access code, and reading systems have become relatively inexpensive.

BRIEF DESCRIPTION OF THE DRAWINGS

Features and advantages of some embodiments of the present invention, and the manner in which the same are accomplished, will become more readily apparent upon consideration of the following detailed description of the invention taken in conjunction with the accompanying drawings, which illustrate preferred and exemplary embodiments only and which are not necessarily drawn to scale, wherein:

FIG. 1 depicts a computer-implemented method for generating an access right to an event.

DETAILED DESCRIPTION

In the following detailed description, numerous non-limiting specific details are given to assist in understanding this disclosure. It will be obvious to a person skilled in the art that the method may be implemented on any type of standalone system or client-server compatible system containing any type of client, network, server, and database elements.

FIG. 1 depicts a computer-implemented method 100 for generating an access code 165 to an event 110.

The method 100 as depicted is performed between the following main parties and/or objects:

a user 120 or consumer 120. The user 120 may use a mobile device 125, such as a mobile telephone, to initiate and/or complete one or more aspects of the method. The user 120 may also be described as a fan;

an access provider 170, who provides access by supplying one or more tickets. For example, SKIDATA—www.skidata.com, or INTELLITIX—intellitix.com. A ticket may be considered an access right 160 (or an access code) to an event 110;

an identification validator 152, who may validate one or more legal form of identification 155. For example, Mitek—www.miteksystems.com, who provide their MiSnap and Mobile Verify facilities which may use the camera of a mobile device. Other services include IDCHECK.IO, ONFIDO, or IDNOW. This validation may also be performed by the access provider 170 or the different tasks may be distributed among the identification validator 152 and the access provider 170;

an event provider (not depicted), responsible for managing the event 110 for which the ticket is being obtained. This may also be the access provider 170; and an access code reader 190, configured and arranged to determine the validity of any access code 165. This may also be operated by the access provider 170.

Larger access providers 170 like SKIDATA and INTELLITIX may provide:

online ticketing—in other words, the one or more access rights 160;

e-tickets for smartphones—in other words, storage of the one or more access rights 160 on mobile devices 125; and access control and turnstiles for arenas—in other words, the one or more access code readers 190.

The method comprises: the user 120 obtaining 320 an access right 160 (or ticket) to the event 110 from an access provider 170. For this aspect of the invention, it is not important how the access right 160 is obtained—it may be the result of a purchase much earlier, it may be provided by the access provider 170 without a specific request from the user 120 (for example, a reward for an important client), it may be provided free of charge following an explicit request from the user 120. Optionally, the user 120 may obtain the access right 160 from the access provider 170 in exchange for payment 310—this payment may be made using one or more payment card 145. The user 120 may use any computing device for this interaction, including the mobile device 125.

Preferably, at some time earlier than the performing of this method 100, the user 120 has established 350 a relationship with the access provider 170. This is also called enrollment or registration, and typically requires a personal account to be made. If the access right 160 was purchased 310, then it may be convenient to establish 350 the relationship at that moment. In some cases, the access provider 170 may invite the user 120 via SMS and/or email to enroll 350 through an app from the access provider 170. Alternatively, enrollment 350 may have taken place many days, weeks or even months earlier. It may have also taken place before, during or after a previous purchase. If enrollment 350 has not yet taken place, it should take place now.

The user 120 authenticates 330 themselves to the access provider 170 using a legal form of identification (ID) 155 comprising one or more biometric identifiers 157. For the access provider 170, this may be a lengthy and complex procedure, requiring sufficient knowledge and facilities to validate the form of identification 155, so they will typically engage an identification validator 152 to perform this step. This user 120 may communicate directly with the identification validator 152, or with the access provider 170, or a combination (the validation tasks may be divided between the identification validator 152 and the access provider 170). The user 120 may use any computing device for this interaction, including the mobile device 125. Preferably the mobile device 125 is used—an app from the access provider 170 may be used or a third-party app. Within such an app, the user 120 may scans his/her legal form of ID 155 and arrange for the verification 330, 340. If the mobile device 125 is not used, a copy of at least the one or more biometric identifiers 157 should be downloaded onto the mobile device 125 for the following comparison step.

Although depicted as occurring after obtaining the access right 160, it may be convenient to authenticate 330 together with the enrollment 350 if that occurred earlier. Additionally or alternatively, authentication 330 may have taken place many days, weeks or even months earlier. It may have also taken place before, during or after a previous purchase. If authentication 330 has not yet taken place and/or an earlier authentication 330 has expired (for example, if the legal form of identification 155 is no longer valid), it should take place now.

The user 120 provides 330 a legal form of identification 155, preferably issued to the user 120—for example, —a legal license issued to the user 120 to operate a vehicle (Driver's License or Driver's Permit); a travel document issued to the user 120 by a government (Passport or Travel ID); a national identification issued to the user 120 by a government; a military identification issued to the user 120 by a government; a residence permit issued to the user 120 by a government; a birth certificate issued by a government; a social security card issued to the user 120 by a government; or any combination thereof.

The legal form of identification (ID) 155 comprises biometric data 130 and/or one or more biometric identifiers 157—for example, a physiological characteristic, a palm print, a blood vessel appearance, a measurement of a physical feature, geometry of a hand, a retina scan, a fingerprint, a signature, a face scan, a photograph of the user, DNA, an odor or scent, a behaviometric, a gait, a gaze, eye movement, a voice scan, a typing rhythm, a tapping rhythm, or any combination thereof.

After receiving the legal form of identification 155, preferably in digital form, the access provider 170 and/or identification validator 152 check to see if the document is valid and genuine. The outcome is then reported back 340 to the user 120—if the ID 155 is considered valid and genuine, then method 100 may continue. If the ID 155 is not valid and/or genuine, the user 120 may be prompted to provide an alternative ID 155. If no alternative ID 155 is available, or it is also found to be invalid and/or not genuine, the rest of the method 100 may be terminated.

The method 100 further comprises: the user 120 generating 360 an access code 165 using the mobile device 125, wherein the user 120 provides biometric data 130 to the mobile device 125; the biometric data 130 is compared to the one or more biometric identifiers 157; and if the biometric data is approved, the access code 165 is generated 360 as a combination of the access right 160 to the event 110, the user 120 and the mobile device 125.

The access right 160 to the event 110 comprises the ticket number obtained 320 from the access provider 170. If not already comprised in the ticket number of access right 160, additional parameters may also be added such as information about the access provider 170 and or information about the event 110, such as the date it is to take place.

The biometric data 130 may be any kind of biometric parameters which may be compared with the biometric identifiers 157, and which may be recorded and/or detected by the mobile phone 125. The list of examples provided above for biometric identifiers 157 may therefore be suitable in certain configurations. If the biometric data 130 is not approved, the user 120 may be allowed to take another picture and/or to provide different biometric data 130, such as a fingerprint.

For example, if the biometric identifiers 157 from the legal form of ID 155 are based on a portrait photo, then the camera of the mobile device 125 may be used to take a similar self-portrait photo as the biometric data 130 for the comparison. The photos 130, 157 may be converted to biometric profiles for the comparison and/or some other suitable form of image comparison may be used.

The user 120 data may therefore comprise one or more records from the biometric data 130, or following approval, a different parameter which may be used to identify the user 120 such as the payment card number 145 used to provide payment 310.

The mobile device 125 data may comprise any parameters that uniquely identify the device 125, such as a telephone number, a SIM-card number, a software/firmware version, a serial number, and/or an IMEI number.

Optionally, before generating 360 the access code 165, the input data may be checked. For example:
may the access right 160 to the event 110 still be used? If the access right 160 has been flagged as stolen or resold, additional checks may be performed before the access right 160 may be used and/or use may simply be blocked.
may the mobile device 125 still be used? If the mobile device 125 has been flagged asp stolen, additional checks may also be performed and/or use may be blocked.
may the biometric identifiers 157 still be used? If they have been flagged as out of date or stolen, additional checks may also be performed and/or use may be blocked.

The access code 165 generated 360 is a combination of the access right 160 to the event 110 (the ticket), the user 120 and the mobile device 125.

For example, following successful approval of the biometric data 130, an app provided by the access provider 170 may generate an access right 160, and may further generate a QR code and/or an NFC message as one or more representations of the access code 165.

After successful generation 360, the access code 165 may be used to access the event 110:
the user 120 provides 370 the access code 165 using the mobile device 125 to an access code 165 reader 190;
the access code 165 reader 190 verifying the validity of the access code 165; and
if the access code 165 is approved, access to the event 110 for the user 120 is granted 380.

By using these three data inputs, a substantially unique access code 165 is generated. Complicated authentication, such as facial recognition at an entrance to the event 110, is no longer required, as it has already been performed before approaching the access code reader 190. Pre-authentication may significantly increase the flow of attendees through the entrance. It also allows a more complete overview of actual identities and a more accurate overview of the number of attendees. In addition, paper-based tickets are no longer required—all access may be digital.

Most mobile devices 125 further comprise a display. It may be configured and arranged to present a 2-dimensional (2D) coded representation of the access code 165 on the display. In fact, only relatively simple hardware is needed in the access code reader 190 if a 2-D code, such as a QR code, is used.

Other representation of the access code 165 that may be used include: an unencrypted QR code, an encrypted QR code, an EMV-compliant QR code, an EMV QRCPS-compliant QR code, a 2D barcode, a 2D dot code, a Micro QR code, an IQR code, a HCC2D code, an SQRC code, a FrameQR code, an Anato dot pattern, an Aztec code, a CrontoSign, a ColorCode, a Color Construct Code, a CyberCode, a d-touch, a DataGlyph, a Data Matrix, a Datastrip code, a Digimarc Barcode, a DotCode, a Dot Code, a DWCode, an EZcode, a High Capacity Color Barcode, a Han Xin Barcode, a HueCode, an InterCode, a MaxiCode, an MMCC, an MPQR code, a NexCode, a PDF417, a Qode, an AR Code, a ShotCode, a Snapcode, a SPARQCode, a VOICEYE, or any combination thereof.

Any convenient technology may be used to provide 370 the access code 165 to, for example an access code reader 190 using electrical contact, close coupling, electromagnetic radiation, NFC, RF, Bluetooth, WiFi, mobile data, LAN, USB, HTTP, HTTPS, FTP, or any combination thereof.

By promoting the use of mobile devices 125 instead of paper-based tickets, the event organizer may send notifications either as SMS, or through their app, for security, crowd control or commercial purposes.

Optionally, additional restrictions may be implemented to prevent access with fraudulent copies. For example, a screenshot of a legitimate copy may be made and shared and/or resold. The likelihood of acceptance may be reduced by, for example, enforcing the use of the app which may comprise a dynamic feature.

Optionally, it may be advantageous to provide 390 the access code 165 to the access provider 170 as they typically maintain a database of attendees and their access rights 160 and/or access codes 165. For example, the user 120 providing 390 the access code 165 to the access provider 170; and the access provider 170 storing the access code 165 in an electronic computer database associated with the event 110.

It may be convenient to use the mobile device 125 to provide 390 the access code 165 to the access provider 170.

By using these three data inputs, a substantially unique access code 165 is generated. It is coupled to the combination of access right 160+device 125+user 120. This means that the access code 165 is no longer transferrable to a further user.

However, the access right 160 may still be freely transferred before it is converted to an access code 165.

Although the present invention has been described in connection with specific exemplary embodiments, it should be understood that various changes, substitutions, and alterations apparent to those skilled in the art can be made to the disclosed embodiments without departing from the scope of the invention as set forth in the appended claims.

REFERENCE NUMBERS 100 computer-implemented method for generating an access right
110 event
120 user or consumer (granted access to event)
125 mobile device
130 biometric data (associated with a user)
140 payment data (associated with a user)
145 payment card
150 identification data (associated with a user, representing identification)

152 identification validator
155 legal form of identification
157 one or more biometric identifier
160 access right (ticket)
165 access code (user+ticket+device)
170 access provider
190 access code reader
310 provide form of payment
320 obtain access right (ticket)
330 provide form of identification
340 validate form of identification
350 user establishes relationship with access provider (enrollment)
360 generate access code (user+ticket+device)
370 provide access code to enter event
380 grant access to event
390 provide access code to access provider

What is claimed is:

1. A computer-implemented method for generating an access code to an event, the method comprising:
  obtaining an access right to the event from an access provider;
  receiving a scanned legal form of identification of a user comprising one or more biometric identifiers;
  providing the scanned legal form of identification of the user comprising the one or more biometric identifiers to the access provider to authenticate the user; and
  generating an access code on a mobile device by:
    obtaining biometric data of the user via the mobile device;
    comparing the obtained biometric data to the one or more biometric identifiers from the scanned legal form of identification; and
    if the biometric data is approved, generating the access code as a combination of the access right to the event, the user, and the mobile device.

2. The computer-implemented method according to claim 1, further comprising:
  providing the access code to an access code reader for approval of the access code; and
  upon approval of the access code, granting access to the event for the user.

3. The computer-implemented method according to claim 1, further comprising:
  providing the access code to the access provider for storage in an electronic computer database associated with the event.

4. The computer-implemented method according to claim 1, wherein the scanned legal form of identification issued to the user is a scanned digital form of one or more selected from the group consisting of:
  a legal license issued to the user to operate a vehicle;
  a travel document issued to the user by a government;
  a national identification issued to the user by a government;
  a military identification issued to the user by a government;
  a residence permit issued to the user by a government;
  a birth certificate issued by a government; and
  a social security card issued to the user by a government.

5. The computer-implemented method according to claim 1, wherein obtaining the access right to the event from the access provider comprises obtaining the access right from the access provider in exchange for payment.

6. The computer-implemented method according to claim 1, wherein the biometric data and the one or more biometric identifiers comprise a selection of one or more from the group consisting of:
  a physiological characteristic, a palm print, a blood vessel appearance, a measurement of a physical feature, geometry of a hand, a retina scan, a fingerprint, a signature, a face scan, a photograph of the user, DNA, an odor or scent, a behaviometric, a gait, a gaze, eye movement, a voice scan, a typing rhythm, and a tapping rhythm.

7. The computer-implemented method according to claim 1, further comprising providing a 2-dimensional coded representation of the access code.

8. The computer-implemented method according to claim 7, wherein:
  the 2-dimensional coded representation of the access code is an unencrypted QR code, an encrypted QR code, an EMV-compliant QR code, an EMV QRCPS-compliant QR code, a 2D barcode, a 2D dot code, a Micro QR code, an IQR code, a HCC2D code, an SQRC code, a FrameQR code, an Anato dot pattern, an Aztec code, a CrontoSign, a ColorCode, a Color Construct Code, a CyberCode, a d-touch, a DataGlyph, a Data Matrix, a Datastrip code, a Digimarc Barcode, a DotCode, a Dot Code, a DWCode, an EZcode, a High Capacity Color Barcode, a Han Xin Barcode, a HueCode, an InterCode, a MaxiCode, an MMCC, an MPQR code, a NexCode, a PDF417, a Qode, an AR Code, a ShotCode, a Snapcode, a SPARQCode, a VOICEYE, or any combination thereof.

9. The computer-implemented method according to claim 1, further comprising providing the access code using electrical contact, close coupling, electromagnetic radiation, NFC, RF, Bluetooth, WiFi, mobile data, LAN, USB, HTTP, HTTPS, FTP, or any combination thereof.

* * * * *